(12) United States Patent
Jones

(10) Patent No.: US 8,741,088 B2
(45) Date of Patent: Jun. 3, 2014

(54) REINFORCED MAGNET

(71) Applicant: Dyson Technology Limited, Wiltshire (GB)

(72) Inventor: David Michael Jones, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 13/734,437

(22) Filed: Jan. 4, 2013

(65) Prior Publication Data

US 2013/0146206 A1 Jun. 13, 2013

Related U.S. Application Data

(62) Division of application No. 13/240,676, filed on Sep. 22, 2011.

(30) Foreign Application Priority Data

Sep. 23, 2010 (GB) .................................. 1016006.7

(51) Int. Cl.
H01F 41/02 (2006.01)

(52) U.S. Cl.
USPC .............................. 156/242; 156/60; 264/112

(58) Field of Classification Search
USPC .......................................................... 156/242
See application file for complete search history.

(56) References Cited

U.S. PATENT DOCUMENTS

| | | | |
|---|---|---|---|
| 3,482,156 A | 12/1969 | Porath | |
| 3,882,442 A * | 5/1975 | Hubbard | ........................ 338/41 |
| 4,065,190 A | 12/1977 | Hallerback | |
| 4,127,786 A | 11/1978 | Volkrodt | |
| 4,406,958 A | 9/1983 | Palmero et al. | |
| 4,565,493 A | 1/1986 | Hallerbaeck | |
| 5,306,454 A | 4/1994 | Lagergvist | |
| 5,448,123 A | 9/1995 | Nilson et al. | |
| 6,137,390 A * | 10/2000 | Tung et al. | ...................... 336/83 |
| 6,259,180 B1 | 7/2001 | Pop, Sr. | |
| 6,661,145 B1 | 12/2003 | Nilson | |
| 6,759,935 B2 * | 7/2004 | Moro et al. | ..................... 336/83 |
| 7,679,252 B2 | 3/2010 | Iwase et al. | |
| 2002/0180038 A1 * | 12/2002 | Oshima et al. | ................ 257/729 |
| 2004/0258436 A1 | 12/2004 | Nakamura et al. | |
| 2008/0044680 A1 | 2/2008 | Thibodeau et al. | |

FOREIGN PATENT DOCUMENTS

| | | |
|---|---|---|
| EP | 1 439 627 | 7/2004 |
| FR | 798073 | 5/1936 |
| GB | 1414949 | 11/1975 |

(Continued)

OTHER PUBLICATIONS

Search Report mailed Dec. 14, 2011, directed to GB Application No. 1115159.4; 2 pages.

(Continued)

*Primary Examiner* — Philip Tucker
*Assistant Examiner* — Vicki Wu
(74) *Attorney, Agent, or Firm* — Morrison & Foerster LLP

(57) ABSTRACT

A magnet that includes a composite body and at least one reinforcing element. The reinforcing element is embedded within the body and increases the radial strength of the body. As a result, the magnet is able to rotate at higher speeds without fracturing. Additionally, methods of manufacturing the magnet are described.

2 Claims, 4 Drawing Sheets

(56) References Cited

FOREIGN PATENT DOCUMENTS

| | | |
|---|---|---|
| GB | 2 297 870 | 8/1996 |
| JP | 60-130811 | 7/1985 |
| JP | 63-18950 | 1/1988 |
| JP | 1-129741 | 5/1989 |
| JP | 6-41380 | 5/1994 |
| JP | 8-237915 | 9/1996 |
| JP | 2004-197157 | 7/2004 |
| JP | 2005-312103 | 11/2005 |
| JP | 2009-535530 | 10/2009 |
| WO | WO-95/02269 | 1/1995 |
| WO | WO-97/00549 | 1/1997 |
| WO | WO-00/59097 | 10/2000 |
| WO | WO-2004/008607 | 1/2004 |
| WO | WO-2007/031751 | 3/2007 |
| WO | WO-2010/041121 | 4/2010 |

OTHER PUBLICATIONS

International Search Report and Written Opinion mailed Oct. 31, 2011, directed towards counterpart application No. PCT/GB2011/051651; 9 pages.

Jones D.M., U.S. Office Action mailed Sep. 5, 2012, directed towards U.S. Appl. No. 13/240,676; 8 pages.

Jones, D.M., Office Action mailed Apr. 26, 2013, directed toward U.S. Appl. No. 13/240,676; 8 pages.

Jones, D.M., Office Action mailed Oct. 11, 2013, directed toward U.S. Appl. No. 13/240,676; 12 pages.

\* cited by examiner

REINFORCED MAGNET

REFERENCE TO RELATED APPLICATIONS

This application is a divisional of U.S. patent application Ser. No. 13/240,676, filed Sep. 22, 2011, which claims the priority of United Kingdom Application No. 1016006.7, filed Sep. 23, 2010, the entire contents of which are incorporated herein by reference.

FIELD OF THE INVENTION

The present invention relates to a reinforced magnet suitable for, but not limited to, use in the rotor of an electrical machine.

BACKGROUND OF THE INVENTION

The rotor of an electrical machine may comprise a magnet having a bore through which a shaft is secured. As the rotor rotates, radial forces stress the magnet. Unfortunately, most magnets are relatively brittle and will fracture if subjected to excessive tensile stress. As a result, the speed of the electrical machine may be limited by the tensile strength of the magnet.

SUMMARY OF THE INVENTION

In a first aspect, the present invention provides a magnet comprising a composite body and at least one reinforcing element embedded within the body, the reinforcing element surrounding a bore in the body.

The reinforcing element has a greater radial stiffness and radial tensile strength than that of the composite body and thus acts to oppose radial and circumferential stresses that arise within the body. Consequently, the magnet is able to rotate at higher speeds without fracture of the composite body occurring.

Conventional rotors having a magnet secured to a shaft may include an outer sleeve that applies a compressive force to the magnet. However, the resulting stresses may cause the magnet to creep. As a result, the magnitude of the compressive force may decrease with time. Eventually, the compressive force may be insufficient to oppose the radial forces acting on the magnet and thus the magnet may fracture. By embedding a reinforcing element within a composite body, a reinforced magnet is obtained without the need to pre-stress the magnet. Consequently, the ability of the magnet to withstand radial forces does not diminish with time.

The reinforcing element may be one of a coil and a washer. If the magnet is subjected to a rotating magnetic field (e.g. from a stator of an electrical machine), eddy currents may be induced in the reinforcing element if formed of an electrical conductor. The eddy currents will tend to circulate in loops parallel to the axis of rotation. The reinforcing element, being either a helical shape or a flat annulus, does not include any continuous paths in the axial direction. As a result, any eddy currents induced in the reinforcing element will be relatively small.

The reinforcing element may be thickest in a radial direction, i.e. in a direction normal to a longitudinal axis of the bore. As a result, the reinforcing element has increased radial stiffness. Additionally, the axial thickness of the reinforcing element may be kept relatively small without compromising the radial stiffness. More reinforcing elements may then be embedded within the composite body. Alternatively, if the reinforcing element is a coil, more turns may be employed. Furthermore, a larger interface is created between the reinforcing element and the composite body. As a result, tensile stresses may be better transferred from the composite body to the reinforcing element.

The reinforcing element may lie adjacent the bore, which is to say that the inner diameters of the composite body and the reinforcing element are approximately the same. When the magnet rotates, tensile stresses are greatest at the bore. By locating the reinforcing element adjacent the bore, the reinforcing element is better able to oppose tensile stresses where they are greatest.

The reinforcing element may comprise a coil that extends between opposite ends of the composite body. Alternatively, the magnet may comprise a plurality of washers that are spaced axially along the length of the composite body. As a result, the reinforcing element(s) acts to oppose radial and circumferential stresses along the length of the composite body.

The reinforcing element may comprise a coil formed of a ribbon. The coil is thus thickest in a direction normal to a longitudinal axis of the coil. As a result, the axial thickness of the coil may be kept relatively small without compromising the radial stiffness. Furthermore, a larger interface is created between the coil and the composite body.

The magnet may undergo thermal expansion and contraction during use and/or manufacture. Differences in the coefficients of thermal expansion for the composite body and the reinforcing element may result in low-density regions forming within the composite body, which may weaken the tensile strength of the magnet. The reinforcing element may therefore have a coefficient of thermal expansion that is no greater than twice that of the composite body.

The reinforcing element may be formed of a metal or a pre-preg material, both of which typically have a relatively high stiffness and tensile strength, and tend to form a good bond with most magnetic composites.

In a second aspect, the present invention provides a magnet comprising a composite body and at least one reinforcing element embedded within the body, wherein the body has a rotational axis, and the reinforcing element surrounds the rotational axis and has a radial stiffness and a radial tensile strength greater than that of the body.

Owing to the greater radial stiffness and radial tensile strength, the reinforcing element acts to oppose radial and circumferential stresses that arise within the body during rotation. Consequently, the magnet is able to rotate at higher speeds without fracture of the composite body occurring.

In a third aspect, the present invention provides a rotor comprising a shaft secured to a magnet as described in any one of the preceding paragraphs. Where the composite body comprises a bore, the shaft may be secured within the bore, e.g. by means of an adhesive.

The reinforcing element acts to oppose radial and circumferential stresses arising from rotation of the rotor. As a result, higher rotational speeds are possible without fracture of the magnet.

In a fourth aspect, the present invention provides a method of manufacturing a magnet, the method comprising: providing a mold having a pin; placing a reinforcing element onto the pin; introducing a binder-coated magnetic powder into the mold; and compressing the powder and the reinforcing element.

A magnet is therefore obtained that comprises a composite body having a reinforcing element embedded therein. The pin acts to create a bore in the composite body. By placing the reinforcing element onto the pin, the reinforcing element surrounds the bore in the composite body.

The reinforcing element may comprise one of a coil and a washer. By employing a coil that compresses during compaction of the magnetic powder, a magnet may be obtained that has a reinforcing element that extends along the full length of the magnet.

Similarly, by employing washers that are spaced axially along the pin by the magnetic powder, a magnet may be obtained that has reinforcing elements embedded along the length of the magnet The reinforcing element may comprise a coil formed of a ribbon that is thickest in a direction normal to a longitudinal axis of the coil. A ribbon presents a larger surface area over which the binder may bind to the coil. Additionally, a coil having a relatively weak compressive strength may be used without compromising the radial stiffness. The coil does not therefore impact on the compressive force needed to form the magnet. Additionally, when the magnet is removed from mold, the restoring force of the coil is relatively weak and thus there is relatively little internal axial stress.

In a fifth aspect, the present invention provides a method of manufacturing a magnet, the method comprising: locating a washer between a pair of ring magnets, at least one of the washer and the ring magnets having a curable binder; and curing the binder.

A unitary magnet is therefore obtained that comprises a composite body having a washer embedded therein. The washer, having a greater radial stiffness and radial tensile strength than that of the ring magnets, acts to oppose radial and circumferential stresses acting on the composite body.

The washer may be formed of a pre-preg material, i.e. a composite of reinforcement fibers impregnated with a binder. A pre-preg material typically has a relatively high stiffness and tensile strength. Additionally, the binder of the pre-preg material is generally tacky. Accordingly, the washer may be located between the ring magnets to create an assembly that can be moved conveniently to an oven or the like in order to cure the binder.

The method may comprise providing a plurality of ring magnets and locating a washer between each pair of ring magnets. As a result, a longer reinforced magnet may be achieved.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1:
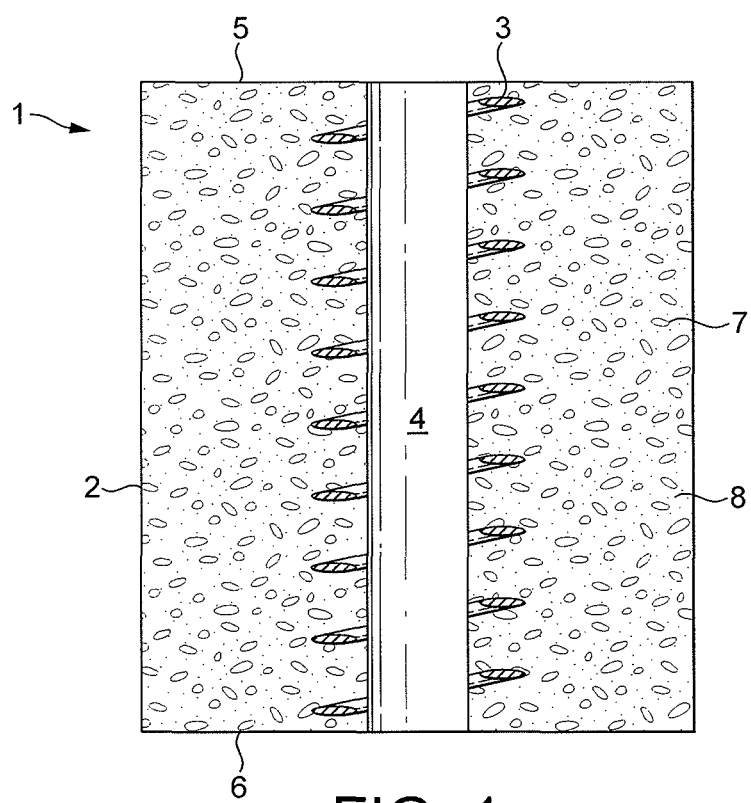
FIG. 1 is sectional view of a magnet in accordance with the present invention.

The magnet 1 of FIG. 1 comprises a composite body 2 having a coil 3 embedded therein.

The composite body 2 is cylindrical in shape and comprises a central bore 4 that extends through the body 2 from a first end 5 to a second end 6. The composite body 2 is formed of a magnetic powder 7 and a binder 8.

The coil 3 is helical in shape and is formed of a ribbon that is thickest in a radial direction, i.e. in a direction normal to the longitudinal axis of the coil 3. The coil 3 is embedded within the composite body 2 and is bound to the body 2 by the binder 8. The coil 3 extends along the full length of the composite body 2 from the first end 5 to the second end 6. The coil 3 surrounds and is coaxial with the bore 4. Moreover, the inner diameters of the composite body 2 and the coil 3 are approximately the same such that the coil 3 lies adjacent the bore 4.

The magnet 1 may form part of a rotor of an electrical machine. In particular, a shaft may be secured within the bore 4, e.g. by means of an adhesive. As the rotor rotates, radial forces stress the magnet 1 radially and circumferentially. In the absence of the coil 3, the resulting strain may cause the composite body 2 to fracture and break apart. The coil 3 has a greater radial stiffness and radial tensile strength than that of the composite body 2. The coil 3 therefore acts to oppose the radial and circumferential stresses acting on the composite body 2. As a result, excessive strain of the composite body 2, which might otherwise result in fracture of the magnet 1, may be avoided.

Most binders are relatively good at opposing shearing stresses but are relatively poor at opposing purely tensile stresses. By embedding a coil 3 within the composite body 2, an interface is created between the coil 3 and the binder 8 that extends radially and circumferentially. Consequently, when the magnet 1 is subjected to radial forces, a shearing force is created between the binder 8 and the coil 3. The binder 8 is therefore able to effectively transfer the stresses from the composite body 2 to the coil 3. In contrast, if the coil 3 were replaced with a cylindrical sleeve, the interface between the sleeve and the binder 8 would extend in an axial direction only. Consequently, when the magnet 1 is subjected to radial forces, a purely tensile stress is created between the sleeve and the binder 8. As a result, the bond between the binder 8 and the sleeve may fail.

By forming the coil 3 from a ribbon, the binder 8 binds to the coil 3 over a larger surface area. Additionally, since the ribbon is thickest in the radial direction, a greater radial interface is created between the binder 8 and the coil 3. As a result, the binder 8 is better able to transfer radial and circumferential stresses from the composite body 2 to the coil 3. The radial stiffness of the coil 3 is also increased. As a result, the axial thickness of the coil 3 may reduced. This then permits a greater number of turns for the coil 3, thus further strengthening the composite body 2. Furthermore, a coil 3 having a relatively weak axial stiffness may be used without compromising on radial stiffness. As detailed below, this then aids in the manufacture of the magnet 1 and reduces internal axial stresses.

The radial and circumferential stresses that arise during rotation of the magnet 1 are greatest at the bore 4 of the composite body 2. By locating the coil 3 adjacent the bore 4, the coil 3 is better able to oppose stresses where they are greatest.

When the magnet 1 rotates within a magnetic field, or is exposed to a rotating magnetic field (e.g. from a stator of an electrical machine), eddy currents will be induced in the coil 3 if formed of an electrical conductor. The eddy currents will tend to circulate in loops parallel to the axis of rotation. The coil 3, being of a helical shape, does not include any continuous axial paths. As a result, any eddy currents induced in the coil 3 will be relatively small. Additionally, by forming the coil 3 from a ribbon, the axial thickness of the coil 3 may be kept relatively small, thus further reducing the magnitude of any eddy currents.

Conventional rotors having a magnet secured to a shaft may include an outer sleeve that applies a compressive force to the magnet. However, the resulting stresses may cause the magnet to creep. As a result, the magnitude of the compressive force may decrease with time. Eventually, the compressive force may be insufficient to oppose the radial forces acting on the magnet and thus the magnet may fracture. In contrast, by embedding a coil 3 within a composite body 2, a reinforced magnet 1 is obtained without the need to pre-stress the magnet 1. Consequently, the ability of the magnet 1 to withstand radial forces does not diminish with time. Moreover, the sleeve may be omitted altogether and thus a cheaper and lighter rotor may be realized.

Figure 2:
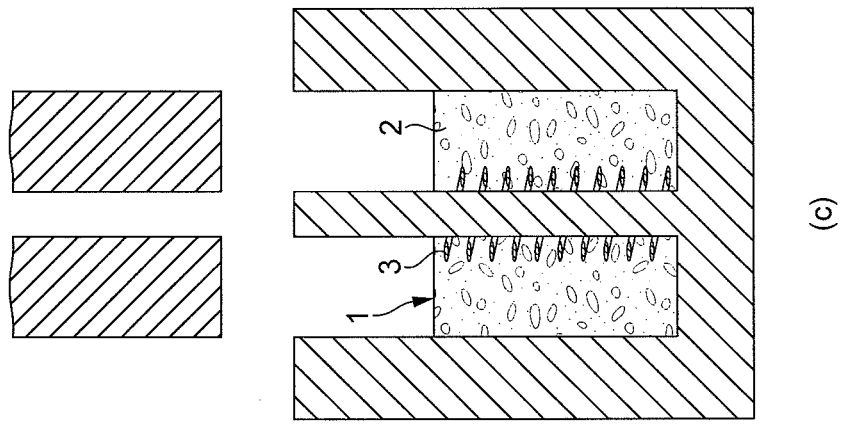
FIG. 2 illustrates stages in the manufacture of the magnet.
Figure 2:
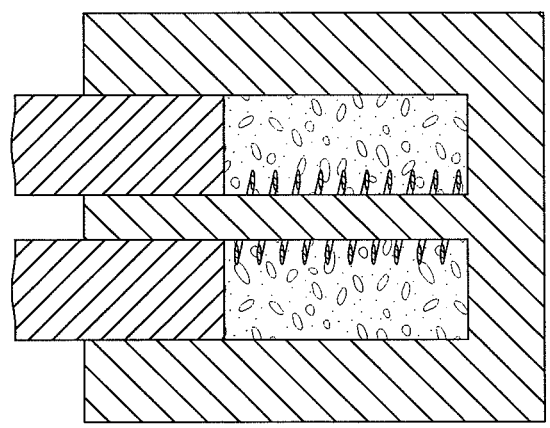
Figure 2:
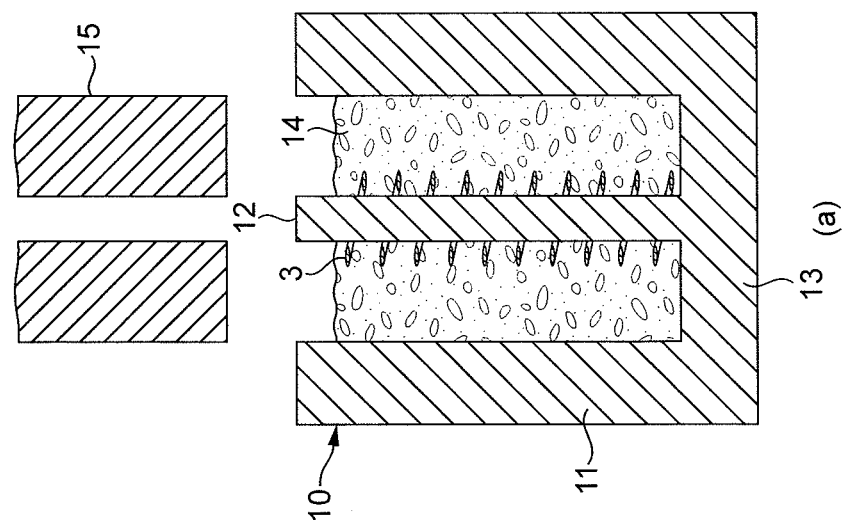

A method of manufacturing the magnet 1 will now be described with reference to FIG. 2.

A mold 10 having a cylindrical outer wall 11 and a central cylindrical pin 12 upstanding from a base 13 is provided. A coil 3 is placed onto the pin 12 of the mold 10. A binder-coated magnetic powder 14 is then introduced into the mold 10. The powder 14 penetrates the gaps in the coil 3 and covers the top of the coil 3. A press 15 then applies a downward force and compresses the coil 3 and the magnetic powder 14 within the mold so as to form a unitary magnet 1. The magnet 1 is then removed from the mold 10, placed in an oven, and heated so as to cure the binder 8.

By employing a coil 3 that compresses during compaction of the binder-coated powder 14, a composite body 2 is obtained that has an embedded coil 3 that extends along the full length of the body 2. Owing to manufacturing tolerances (e.g. tolerances in the amount of powder 14 introduced into the mold 10, the distribution of the powder 14 within the mold 10, and the magnitude of the downward force), there is a tolerance in length of the finished magnet 1. Additionally, there is a tolerance in the initial length of the coil 3. However, since the coil 3 compresses along with the binder-coated powder 14, the finished magnet 1 has an embedded coil 3 that extends along the full length of the composite body 2 irrespective of the manufacturing tolerances.

Forming the coil 3 from a ribbon has two benefits in terms of the manufacture of the magnet 1. First, a ribbon presents a larger surface area over which the binder 8 may bind to the coil 3. Second, a coil 3 having a relatively weak axial stiffness may be used without compromising on radial stiffness. In having a relatively weak axial stiffness, the coil 3 does not impact on the compressive force needed to form the magnet 1. Additionally, when the magnet 1 is removed from mold 10, the restoring force of the coil 3 is relatively weak. There is therefore little danger of the magnet 1 breaking apart prior to or during curing. Additionally, internal axial stresses within the magnet 1 are relatively small.

The coil 3 of the embodiment described above is resilient, which is to say that, when compressed, the coil 3 generates a restoring force. However, the coil 3 need not be resilient. When manufacturing the magnet 1, it is important only that the coil 3 is capable of being compressed. It is not important that the coil 3 is resilient. Indeed, it is advantageous to employ a coil 3 that is not resilient or has little resilience so as to minimize internal axial stresses within the finished magnet 1.

When employing the method described above, the coil 3 is first placed into the mold 10 and then the magnetic powder 14 is introduced. As a result, relatively little magnetic power 14 surrounds the bottom turn of the coil 3. There is therefore a risk that, when compressed, the restoring force of the coil 3 may cause the bottom end of the coil 3 to break through the lower end 6 of the composite body 2. In order to avoid this situation from arising, a small amount of magnet power 14 may be placed into the mold 10 before inserting the coil 3. Alternatively, the coil 3 may terminate with straight axially-extending ends. The magnet 1 is then manufactured in the same manner as that described above. The straight ends of the coil 3 then ensure that magnetic power 14 finds it way both below and above the end turns of the coil 3.

In the method described above, the magnet 1 is removed after molding and placed into an oven in order to cure the binder 8. However, not all binders require elevated temperatures in order to cure. For example, the binder 8 may cure under the compressive force applied by the press 15, or the binder 8 may cure at room temperature. It is not therefore essential to cure the magnet 1 at elevated temperatures after molding.

Compression molding has the advantage that the magnet 1 may be manufactured using relatively small amounts of binder. As a result, a magnet 1 having relatively good magnetic properties may be achieved. Nevertheless, the magnet 1 may also be manufactured by injection molding. For example, the composite of magnetic power 7 and binder 8 may be heated to create a melt which is then injected into a mold containing the coil 3. While injection molding enables irregular-shaped magnets to be formed, a larger amount of binder is generally required in order that the melt has the necessary viscosity. This in turn results in a magnet having poorer magnetic properties.

The particular choice of magnetic powder 7 and binder 8 used for the composite body 2 is not deemed relevant to the present invention. Any magnetic powder 7 and binder 8 that are conventionally employed in the manufacture of bonded magnets may be used.

The coil 3 is intended to oppose the radial and circumferential stresses that act on the magnet 1 during subsequent rotation. Accordingly, the material choice for the coil 3, as well as the thickness and pitch of the coil 3, will depend on the magnitude of the stresses. Suitable candidates for the coil 3 include most metals, which have a relatively high stiffness and tensile strength, and will form a good bond with the binder 8. Nevertheless, other materials, including plastics, may equally be used.

Curing the magnet 1 at an elevated temperature may result in significant thermal expansion of the magnet 1. Alternatively, the temperature range over which the magnet 1 is required to operate may result in significant thermal expansion. The coefficients of thermal expansion for the composite body 2 and the coil 3 are likely to be different. Consequently, the composite body 2 and the coil 3 will expand and contract by different amounts. At elevated temperatures, the composite body 2 softens and thus any difference in the thermal expansions of the body 2 and the coil 3 may be accommodated through viscous deformation of the composite body 2. However, as the magnet 1 cools, the composite body 2 hardens. It is therefore unlikely that the difference in thermal contractions of the body 2 and the coil 3 can be accommodated wholly through viscous deformation of the composite body 2. If the coil 3 has a coefficient of thermal expansion greater than that of the composite body 2, the coil 3 will contract by a larger amount during cooling. As noted above, most binders are relatively good at opposing shear stress but relatively poor at opposing tensile stress. Consequently, as the magnet 1 cools, a low-density region is created in the composite body 2 at the outer edge of the coil 3.

The size and density of the low-density region depend upon, among other things, the difference in the coefficients of thermal expansion of the composite body 2 and the coil 3. In particular, as the difference in the coefficients increases, the size of the low-density region increases and/or the density of the low-density region decreases. As the size of the low-density region increases and/or the pitch of the coil 3 decreases, there comes a point at which the low-density region formed around one turn of the coil 3 combines with the low-density regions formed around adjacent turns. The net result is a continuous low-density region located around the coil 3. This continuous low-density region weakens the tensile strength of the composite body 2. Consequently, the tensile stresses that arise during rotation of the magnet 1 may cause the composite body 2 to split in two at the low-density region.

The applicant has found that, when the magnet 1 is subjected to tensile stresses for which the coil 3 was introduced, the likelihood of failure of the composite body 2 increases significantly when the coefficient of thermal expansion of the coil 3 exceeds twice that of the composite body 2 and/or the pitch of the coil 3 is less than 1 mm. That being said, failure of the magnet 1 due to the low-density region will depend upon many other factors. For example, the particular temperature at which the magnet 1 is cured, the rate at which the magnet 1 is subsequently cooled, and the viscosity of the composite body 2 are all likely to influence the size and density of the low-density regions. Nevertheless, it may be advantageous to employ a coil 3 for which the coefficient of thermal expansion is no greater than twice that of the composite body 2 and/or for which the pitch is no smaller than 1 mm.

Figure 3:
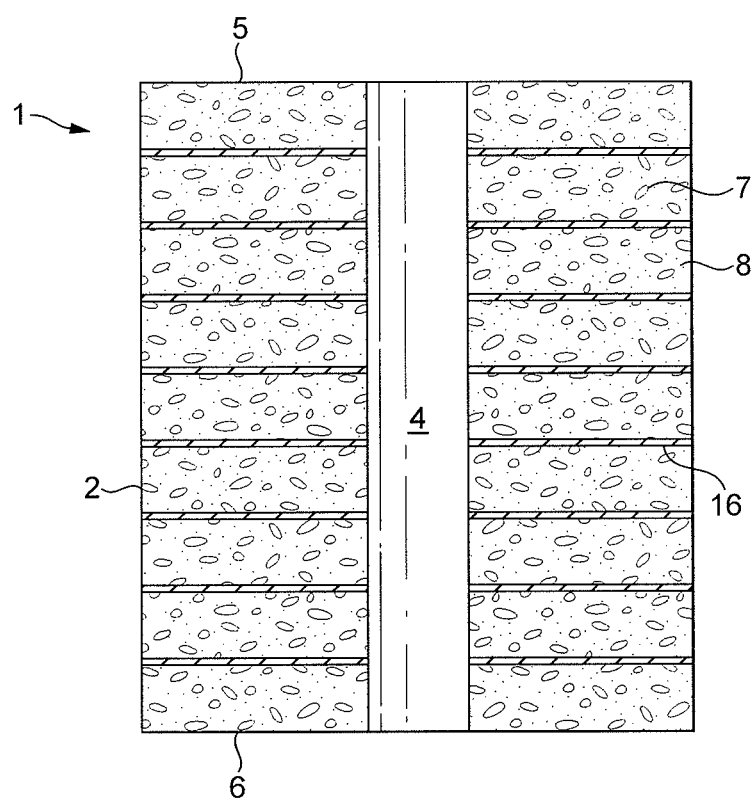
FIG. 3 is a sectional view of a further magnet in accordance with the present invention.

Reference has thus far been made to a magnet 1 having a coil 3 embedded within the composite body 2. However, the magnet 1 may be reinforced by embedding an alternative reinforcing element or elements in the composite body 2. By way of example, FIG. 3 illustrates a magnet 1 in which a plurality of washers 16 are embedded within the composite body 2. The washers 16 surround the bore 4 and are spaced axially along the length of the bore 4. The washers 16, which are thickest in a radial direction, provide the very same advantages as that described above for the coil 3. Indeed, the coil 3 may be regarded as a plurality of linked washers.

By employing washers 16, it is possible to have reinforcing elements for which the inner and outer diameters correspond to those of the composite body 2. The binder 8 then binds to each reinforcing element over a larger surface area. As a result, tensile stresses acting on the composite body 2 may be better transferred to the reinforcing elements. Additionally, since the binder 8 is generally good at opposing shear stress, thermally-induced low-density regions within the composite body 2 may be avoided or significantly reduced in size. Furthermore, since the washers 16 are radial thicker, it is possible to employ axially thinner reinforcing elements without compromising radial stiffness. Nevertheless, it is not essential that the inner and outer diameters of the washers correspond to those of the composite body 2.

A magnet 1 having embedded washers 16 may be manufactured in a similar manner to that described above for the coil 3. For example, a small amount of binder-coated magnetic powder 14 may be introduced into the mold 10, after which a washer 16 is placed onto the pin 12 of the mold 10. Further magnetic powder 14 is then introduced into the mold 10 so as to cover the washer 16, after which a further washer 16 is placed onto the pin 12. This process is then repeated until the mold 10 is filled to the required level. The press 15 then applies a downward force and compresses the magnetic powder 14 and the washers 16 within the mold 10 so as to form a unitary magnet 1. If necessary, the magnet 1 may be removed from the mold 10, placed in an oven, and heated so as to cure the binder 8.

Figure 4:
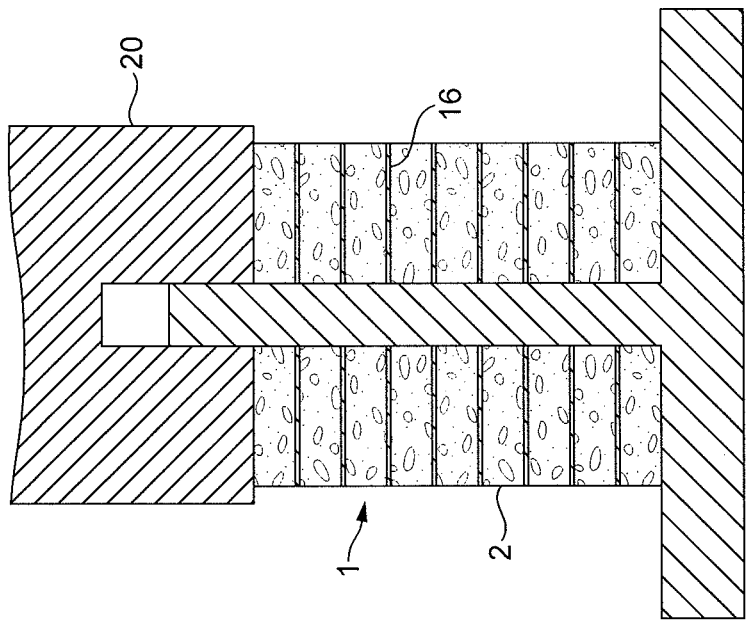
FIG. 4 illustrates stages in the manufacture of the further magnet.
Figure 4:
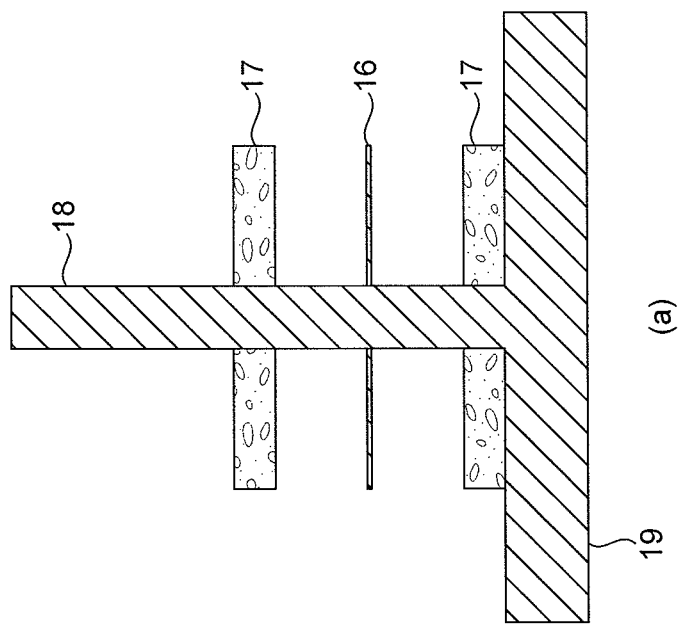

An alternative method of manufacturing a magnet 1 having embedded washers 16 will now be described with reference to FIG. 4. A plurality of ring magnets 17 are placed onto a pin 18 of a jig 19. Each ring magnet 17 is formed of a composite of magnetic powder 7 and binder 8, which may be cured or semi-cured. A washer 16 is located between each pair of ring magnets 17. The washer 16 is formed of a pre-preg material, i.e. a composite of reinforcement fibers (e.g. carbon, aramid or glass fibers) impregnated with a binder. Each washer 16 is relatively thin and may be formed by stamping a pre-preg tape or sheet. A press 20 then applies a downward force on the ring magnets 17 and the washers 16 so as to form a unitary magnet 1. The downward force is relatively small and is intended only to ensure that the washers 16, which are tacky, make good surface contact with the ring magnets 17. The magnet 1 is then removed from the jig 19, placed in an oven and cured at an elevated temperature.

There are several advantages in using a pre-preg material for the washers 16. First, pre-preg materials typically have a relatively high stiffness and tensile strength. Second, in comparison to other materials having a high stiffness and tensile strength, particularly metals, the coefficient of thermal expansion of a pre-preg material is likely to more closely match that of the composite body 2. Third, the binder of a pre-preg material is generally tacky. Consequently, after locating the washers 16 between the ring magnets 17, the resulting assembly can be conveniently lifted from the jig 19 and placed in an oven for curing. Nevertheless, in spite of the aforementioned advantages, it is not essential that the washers 16 are formed of a pre-preg material. For example, the washers 16 may be formed of a metal.

Irrespective of whether the washers 16 are formed of a pre-preg material, or whether the ring magnets 17 are cured or semi-cured, it is important that at least one of the washers 16 and the ring magnets 17 comprises a curable binder. The magnet 1 may then be manufactured by locating the washers 16 between the ring magnets 17 and curing the binder. Depending on the type of binder that is used, various options may be available for curing the binder, e.g. heat, pressure, UV light.

The term 'washer' should be understood to mean a flat annulus. However, it is not essential that the annulus is circular. For example, the annulus might be square or hexagonal. This would then make more efficient use of the pre-preg material when the washer 16 is stamped from a pre-preg tape or sheet. Accordingly, in a more general sense, the term 'washer' should be understood to mean a flat element having a hole.

The invention claimed is:

1. A method of manufacturing a magnet, the method comprising:
    providing a mold having a pin;
    placing a coil onto the pin;
    introducing a binder-coated magnetic powder into the mold; and
    compressing axially the powder and the coil such that the length of the coil compresses along with the powder.

2. A method of manufacturing a magnet, the method comprising:
    providing a mold having a pin;
    placing a plurality of washers onto the pin and introducing a binder-coated magnetic powder into the mold such that the washers are spaced axially along the pin by the powder; and
    compressing axially the powder and the washers.

* * * * *